US006407660B1

United States Patent
Bomya

(10) Patent No.: US 6,407,660 B1
(45) Date of Patent: Jun. 18, 2002

(54) MAGNETIC SENSOR

(75) Inventor: Timothy J. Bomya, Westland, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/648,607

(22) Filed: Aug. 26, 2000

Related U.S. Application Data

(60) Provisional application No. 60/151,223, filed on Aug. 26, 1999.

(51) Int. Cl.$^7$ .................................................. B60Q 1/00
(52) U.S. Cl. ....................... 340/436; 340/547; 340/438; 280/735
(58) Field of Search ................................. 740/436, 433, 740/545.1, 547, 551; 280/728.1, 728.2, 734, 735

(56) References Cited

U.S. PATENT DOCUMENTS

| | | | |
|---|---|---|---|
| 3,945,459 A | 3/1976 | Oishi et al. ................. | 180/274 |
| 4,087,782 A | 5/1978 | Oishi et al. ................. | 180/271 |
| 4,446,741 A | 5/1984 | Sirokorad et al. ............ | 73/654 |
| 4,561,314 A | 12/1985 | Alley et al. ............... | 73/862.69 |
| 4,754,644 A | 7/1988 | Valentini .................. | 73/517 R |
| 4,802,368 A | 2/1989 | Nordvall .................. | 73/862.69 |
| 4,823,621 A | 4/1989 | Sobel ....................... | 73/862.69 |
| 4,866,418 A | 9/1989 | Dobler et al. ............... | 340/429 |
| 4,991,301 A | 2/1991 | Hore .......................... | 33/366 |
| 5,007,295 A | 4/1991 | Gustafsson et al. ...... | 73/862.69 |
| 5,177,370 A | 1/1993 | Meister ..................... | 307/10.1 |
| 5,281,780 A | 1/1994 | Haland ..................... | 200/52 R |
| 5,437,197 A | 8/1995 | Uras et al. ............... | 73/862.69 |
| 5,580,084 A | 12/1996 | Gioutsos .................... | 280/735 |
| 5,646,613 A | 7/1997 | Cho .......................... | 340/903 |
| 5,707,076 A | 1/1998 | Takahashi .................. | 280/735 |
| 5,723,789 A | 3/1998 | Shannon .................. | 73/514.31 |
| 5,739,757 A | 4/1998 | Gioutsos .................... | 340/667 |
| 5,747,696 A | 5/1998 | Kwun et al. .................. | 73/728 |
| 6,039,345 A | 3/2000 | Cech et al. ................. | 280/735 |

FOREIGN PATENT DOCUMENTS

| | | |
|---|---|---|
| EP | 0 453 824 A1 | 10/1991 |
| JP | 56-157802 | 5/1981 |

OTHER PUBLICATIONS

Kwun, H., "Magnetostrictive Sensors Technology", reprinted from Technology Today, Mar., 1995, pp. 3–7.
Uras, M., "Signal Detection Methods for Magnetostrictive Sensors", 970604, reprinted from *Sensors and Actuators* 1997, SP–1220, Society of Automotive Engineers, Feb. 24, 1997, pp. 23–33.

*Primary Examiner*—Edward Lefkowitz
(74) *Attorney, Agent, or Firm*—Dinnin & Dunn P.C.

(57) ABSTRACT

A vehicle crash is sensed by generating a magnetic flux in a body portion of a vehicle from an intrinsic magnetomotive force in the body portion, conducting the magnetic flux in a closed magnetic circuit within the vehicle, generating a signal responsive to the magnetic flux, and discriminating the vehicle crash responsive to the signal, wherein the magnetic circuit comprises the body portion, which is subject to impact during the vehicle crash.

12 Claims, 2 Drawing Sheets

Figure 1:
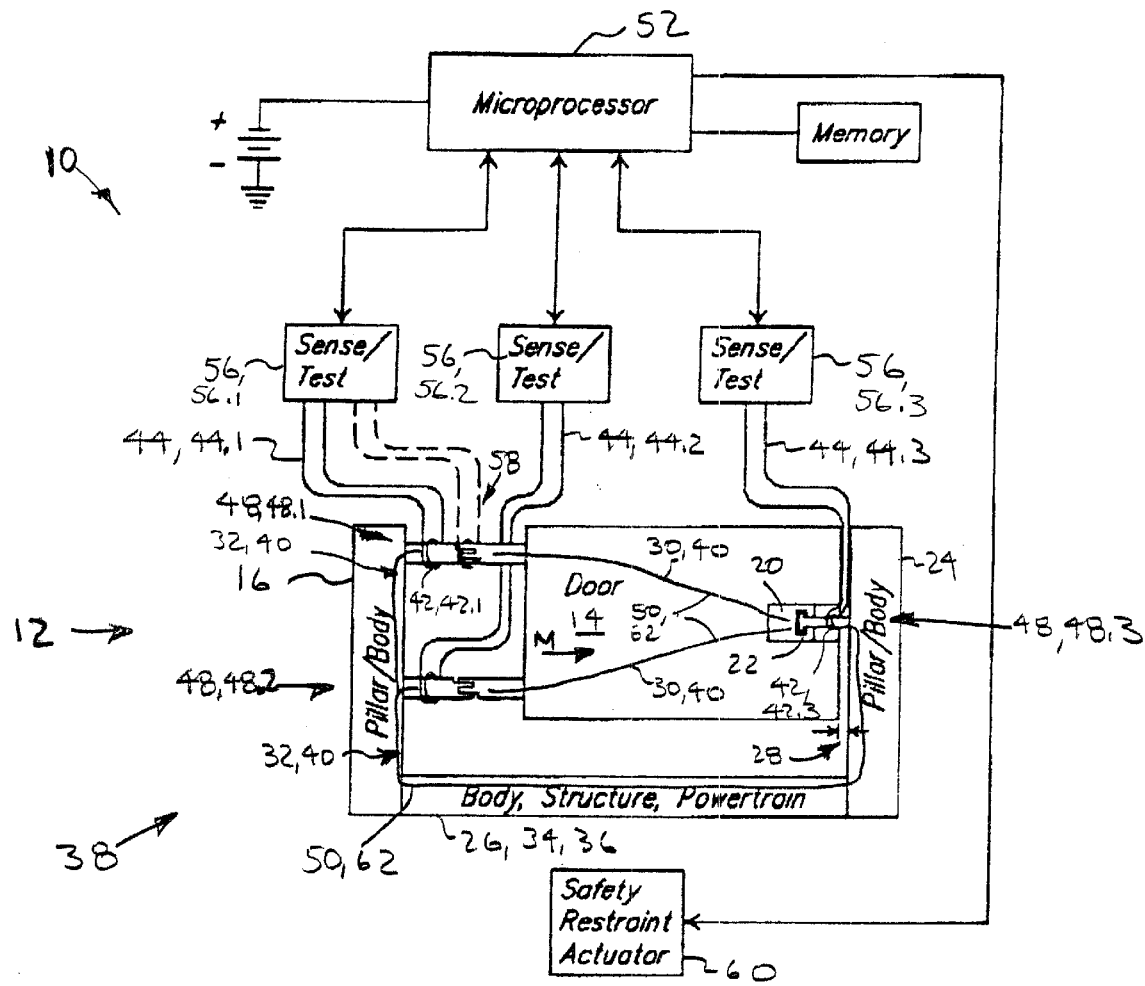

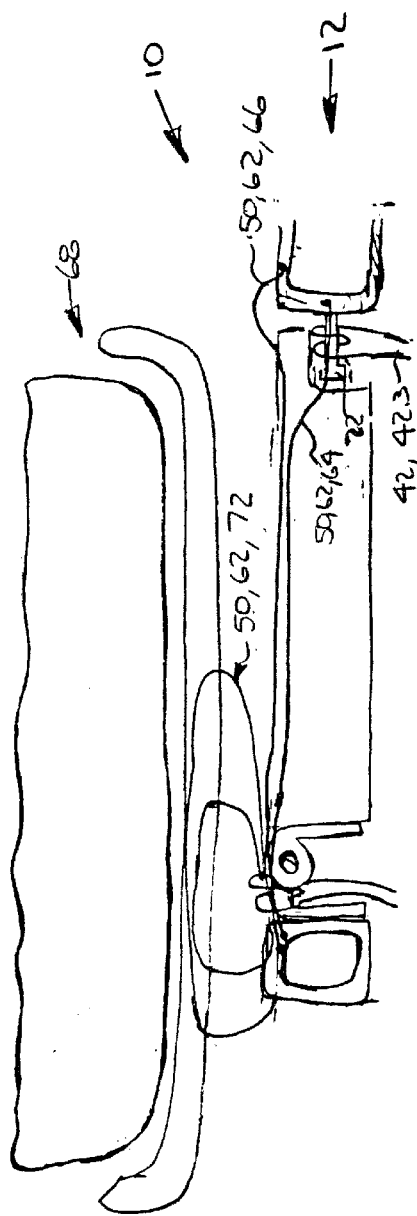
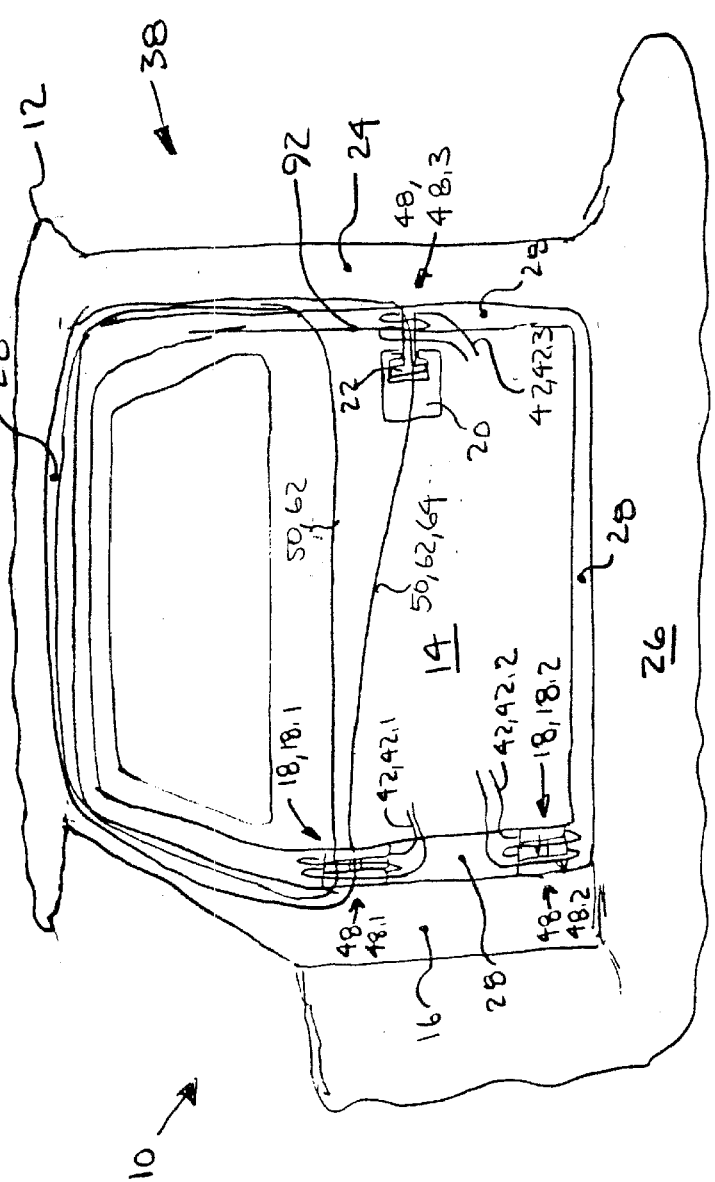

MAGNETIC SENSOR

The instant application claims the benefit of prior U.S. Provisional Application Serial No. 60/151,223 filed on Aug. 26, 1999, which is incorporated herein by reference.

In the accompanying drawing:

FIG. 1 illustrates a block diagram of a magnetic sensor;
FIG. 2a illustrates a side view of a magnetic circuit; and
FIG. 2b illustrates a top view of a magnetic circuit.

Referring to FIG. 1, a magnetic sensor 10 is incorporated in a vehicle 12 shown schematically comprising a door 14 that hinges with respect to a first pillar 16 about a plurality of hinges 18. The door 14 has a latch/lock mechanism 20 that latches to a striker 22 on a second pillar 24.

The door 14—typically constructed with magnetically-permeable steel—has intrinsic magnetic properties. For example, the door 14 conducts magnetic flux, thereby enabling a permanent magnet to stick thereto. Moreover, the door 14 has an intrinsic magnetomotive force M, also known as a residual magnetism. The hinges 18 provide a relatively low reluctance path between the door 14 and the first pillar 16. Moreover, the latch/lock mechanism 20 and the striker 22, when engaged, provide a relatively low reluctance path between the door 14 and the second pillar 24. Elsewhere, the door 14 is normally magnetically separated from the body 26 of the vehicle 12 by an associated air gap 28. Accordingly, the hinges 18 and striker 22 are magnetically connected by a first magnetic path 30 along the door 14. Moreover, the first 16 and second 22 pillars—to which the hinges 18 and striker 22 are respectively attached—are magnetically connected by a second magnetic path 32—distinct from the first magnetic path 30—comprising the body 26, structure 34, or powertrain 36 of the vehicle 12. Accordingly, the door 14 is part of a magnetic circuit 38 that is similar in nature to the core of a transformer, as illustrated in FIG. 1, wherein the first 30 and second 32 magnetic paths together constitute a closed magnetic path 40.

The magnetic circuit 38 further comprises at least one coil 42 located at an associated at least one location 48. A ferromagnetic door 14 characterized by an associated intrinsic magnetomotive force M acts to generate a static magnetic flux 50 within the magnetic circuit 38 responsive to the reluctance of the magnetic circuit 38, changes to which as a result of door motion are sensed by the coils 42.1, 42.2 or 42.3. This response—effectively an AC transformer transfer component can provide an independent measure of door motion and impact velocity.

For example, as illustrated in FIG. 1, in a first embodiment, the at least one coil 42 may comprise a plurality of coils 42.1, 42.2 and 42.3 at distinct locations 48.1, 48.2 and 48.3 for example operatively coupled with uniform phasing to the top 18.1 and bottom 18.2 hinges that operatively couple the door 14 to the "A" pillar 16.1. Furthermore, each coil 42.1, 42.2 may be placed around the associated hinge 18.1, 18.2 or around one or more associated mounting bolts that attach the hinge to the first pillar 16 or to the door 14; and the coil 42.3 may be placed around the latch/lock mechanism 20, around the bolts that attach the latch/lock mechanism 20 to the door 14, or around the striker 22; the associated magnetic circuit 38 thereby forming an inductor with a primary of windings comprising the coils 42.1, 42.2 and 42.3 each coupled to a common a core comprising the first pillar 16, the hinges 18.1, 18.2, the door 14, the second pillar 24, the air gap 28 around the door 14, and the remainder of the body 26, the structure 34 and the powertrain 36 of the vehicle 12.

The at least one coil 42 is operatively connected to a sense/test circuit 56, which senses either a current or voltage from the coil 42 and provides amplification and impedance matching as necessary. The sense/test circuit 56 can also test the at least one coil 42 for proper functioning, for example, by monitoring signals therefrom responsive to normal operating events such as mechanical vibration or door opening/closing events; or by monitoring a response of the at least one coil 42 to a signal injected by a supplemental test coil 58 under control of the sense/test circuit 56. The sense/test circuit 56 may also, for example, test the coil 42 for an open or short so as to improve the reliability of the magnetic sensor 10, particularly when used to control the actuation of a safety restraint actuator 60, so as to prevent a false deployment or a failure to deploy when necessary. The integrity, or health, of the at least one coil 42 is, for example, tested every measurement cycle.

The at least one coil 42 may, for example, be made part of a series resonant circuit to increase the current flow therein, thereby increasing the amount of signal responsive to changes in the magnetic flux 50. Increased signal levels provides for a higher signal-to-noise ratio in the signal or signals detected by the magnetic sensor 10.

The above described magnetic sensor 10 can be embodied in various ways. The particular circuitry, whether analog, digital or optical is not considered to be limiting and can be designed by one of ordinary skill in the art in accordance with the teachings herein. For example, where used, an oscillator, amplifier, logic element, modulator, demodulator, A/D converter can be of any known type, for example using transistors, for example field effect or bipolar, or other discrete components; integrated circuits; operational amplifiers, or logic circuits, or custom integrated circuits. Moreover, where used, a microprocessor can be any computing device.

In operation, the intrinsic magnetomotive force M in the door 14 induces a magnetic flux 50 in the magnetic circuit 38 to which the at least one coil 42 is coupled. The magnetic flux 50 is conducted by the door 14, which is a part of the magnetic circuit 38. In accordance with the theory of magnetic circuits and transformers, magnetic lines of flux always close on themselves and preferably follow a path of least magnetic resistance, for example so as to follow the path of ferromagnetic materials, such as steel or ferrite materials. Moreover, changes in area or permeability along the magnetic circuit cause a leakage of magnetic flux 50 proximate thereto, which leakage is also known as fringing. A magnetic circuit 38 is characterized by a reluctance R, wherein the amount of magnetic flux $\phi$ in a magnetic circuit for a given magnetomotive force F is given by $\phi = F/R$. The reluctance R of a series magnetic circuit is given by the sum of the respective reluctances of the respective elements in series. The reluctance of an air gap is significantly greater than that of a ferromagnetic material, and as a result, the magnetic flux leaks into the space surrounding the air gap, forming a leakage field. A ferromagnetic object entering the leakage field provides an alternate path for the magnetic flux, thereby bypassing the air gap and affecting the reluctance of the magnetic circuit 38. Stated in another way, the leakage flux field changes shape so that the ferromagnetic object becomes part of the magnetic circuit 38.

As illustrated in FIG. 1, a door 14 can be modeled as an element of a closed magnetic circuit 38 that is similar to a transformer core. The fore and aft ends of the door 14 are magnetically connected in series with the remainder of the magnetic circuit 38 by the hinges 18 and the coupling of the latch/lock mechanism 20 to the striker 22. The remainder of the door is magnetically insulated from remainder of the magnetic circuit 38 by an air gap 28 that otherwise surrounds the door 14.

The magnetic flux 50 comprises a plurality of magnetic flux lines 62, some of which may leak out beyond the physical boundary of the magnetic circuit 38, particularly at locations proximate to air gaps 28 in the magnetic circuit 38. The magnetic flux lines 62 follow steel and other ferromagnetic elements of the door 14 that attract magnetic flux 50 therein in relation to the permeance thereof in comparison with the substantially lower permeance of the surrounding air.

Referring to FIGS. 2a and 2b, the magnetic flux 50 travels through the magnetic circuit 38, particularly the ferromagnetic portions thereof including those of the portions of the vehicle 12, such as the door 14, that are monitored by the magnetic sensor 10. A first portion 64 of the magnetic flux 50, known herein as the bent metal flux component 64, passes through the ferromagnetic elements of the magnetic circuit 38. The magnetic flux 50 seeks to travel inside the steel structure of the door 14. More magnetic flux 50 automatically enters those parts of the steel that are thicker, which would likely correspond to those elements of the door structure that add strength to the door. Where the steel is thinner, the magnetic flux density is correspondingly reduced. Stated in another way, the magnetic flux 50 travels in ratio metric proportion with the cross-sectional area of the steel. The magnetic flux 50 is generally not present in the plastic parts other than as a result of leakage elsewhere in the magnetic circuit 38, however, for a steel door 14, these parts are generally not structural. Accordingly, the magnetic sensor 10 generates magnetic flux 50 that passes through the structural elements of the door, and is responsive to mechanical changes to these structural elements to a degree that those mechanical changes influence the magnetic flux 50. A second portion 66 of the magnetic flux 50, known herein as the proximity flux component 66, extends outside the physical extent of the magnetic circuit 38.

Changes to the size, shape, position, construction integrity, spot-wield quantity and integrity, material correctness, and assembly alignment of the door 14; or to the magnetic environment proximate to the door 14, for example, by the presence of a ferromagnetic object such as another vehicle 68; affect the magnetic circuit 38, and thereby affect the reluctance of the magnetic circuit 38, which affects the magnetic flux 50 therein.

The door 14, or another part of the magnetic circuit 38 subject to surveillance, may be supplemented or modified by adding or relocating steel or other highly permeable material in the door 14 so as to modify the strength and/or shape of the respective first 88 and second 90 portions of the magnetic flux 50, thereby enhancing the associated magnetic circuit 38. Moreover, this may enable a reduction in gain of the associated sense/test circuits 56.1, 56.2, 56.3, which improves the associated signal-to-noise ratio. The magnetic flux 50 generally follows a path of least reluctance, which typically would correspond to sections of greatest amounts of magnetically permeable material. For a door 14 constructed of steel, this path would then correspond to one or more sections of the door that contribute substantially to the strength of the door 14. Accordingly, the magnetic circuit 38 can be optimized with respect to magnetic performance, strength and cost by this supplementation or modification of the associated magnetically permeable material.

For example, the magnetic circuit 38 can be modified or augmented in various ways, including but not limited to the following:

1. Mu-metal, ferrite or some other magnetic conductor can be added to the door 14, for example to a plastic door, to augment or re-tune the door's natural magnetic characteristic;

2. Holes may be added to the door 14 or modified, thus shifting the magnetic conduction;

3. A supplemental ferrite or mu-metal flexible linkage may be added between the "A" pillar 16.1 and the door 14 for generating the magnetic flux 50, instead of the hinges 18;

4. Ferrite or mu-metal may be placed in the striker 22 and associated coil 42.3 to enhance the magnetic flux 50 therein;

5. A permanent magnet may be added to the door 14 to augment or re-tune the intrinsic permanent magnetic characteristic signal of the magnetic circuit 38;

6. The magnetic structure of the door 14 can be changed, for example by using a thinner metal skin, a plastic door skin, or ferrite rods to change the magnetic gain, so as to enhance proximity sensing for enhanced system safing responsive to the proximity flux component 66;

7. The hinge or striker shape, size, or material can be changed to improve their associated magnetic characteristics; and 8. The door side-guardrail assembly and construction, the hinge assembly, or the latch/lock mechanism/striker assembly can be changed to enhance system performance and sensitivity.

In addition to the herein described use in detecting a crash or an impending crash, the magnetic sensor 10 can also be used to monitor the structural integrity of structural elements of the magnetic circuit 38, particularly the structural integrity of the door 14, for example as a post manufacturing inspection of a door 14 either mounted to a vehicle 12, or separate therefrom in a magnetic circuit of an associated test apparatus. For example, a missing structural element, such as guard rail, or poor spot welds, would likely affect the reluctance of the door 14 and if so, could be detected prior to assembly. Stated another way, a steel door that does not conduct magnetic flux 50 well would not likely have sufficient side-impact strength.

The coils 42.1, 42.2 and 42.3 are responsive to a superposition of the first 88 and second 90 portions of magnetic flux 50 at the respective locations 48.1, 48.2, 48.3. Locating a coil 42.3 proximate to the end wall 70 of the door 14 enhances the awareness of the proximity flux component 66 of the magnetic flux 50. This suggests that the latch/lock mechanism 20—a localized thickening of the door metal—may act be as a magnetic lens to magnify the effect of the proximity flux component 66 at the coil 42.3 so located. The air gap 28 helps to create the proximity flux component 66, and the region of greatest sensitivity by the proximity flux component 66 to approaching objects is proximate to the air gap 28. Impacts to the door 14 tend to modulate the air gap 28, causing significant changes to the associated magnetic flux lines 62, thereby affecting the amount of magnetic flux 50 coupled to the coils 42.1, 42.2 or 42.3. The signal responsive to the modulated air gap 28 provides a measure of instantaneous recoil velocity of the door 14, which may be used to detect door bounce events for which an associated safety restraint actuator 60 is typically not deployed.

More particularly, the door 14 acts as a rigid body at the beginning of a collision and is pushed inwards towards the body of the vehicle 12 against the compliance of the weatherseal surrounding the door 14, thereby exhibiting elastic behavior. The magnetic flux 50 sensed by the coils 42.1, 42.2 or 42.3 changes responsive to the movement of the door, thereby enabling the lateral position and velocity of the door 14 to be measured from that change.

If the momentum of the impact is less than a threshold, for example for small objects or low impact velocities, the door 14 will then bottom out within a range of elastic behavior and rebound, thereby reversing the above described change to the magnetic flux 50 which is indicated by a shift in polarity of the signal from the coils 42.1, 42.2 or 42.3. Accordingly, the detection of such a rebound event is indicative of an impact for which the safety restraint actuator 60 would not be necessary. Otherwise, if the momentum of the impact is greater than a threshold, then the door 14 becomes plastically deformed, resulting in a significant change to the bent metal flux component 64, which can be indicative of a need to subsequently deploy the safety restraint actuator 60. Accordingly, if after an initial movement of the door 14 is detected, either the door 14 fails to rebound and/or a significant bent metal flux component 64 is detected, then the impact might be considered to be sufficiently severe to warrant the deployment of the safety restraint actuator 60. Moreover, the initial velocity of the door 14 can be used as a predictor or indicator of impact severity.

Another vehicle 88 proximate to the at least one coil 42 attracts magnetic flux 50, thereby causing a third portion 72 of the magnetic flux 50 generated by the intrinsic magnetomotive force M to bypass the magnetic circuit 38. Moreover, if the door becomes dented or deformed, the distribution and/or strength of the magnetic flux 50 in the door 14 changes, which change is sensed by the magnetic circuit 38. Accordingly, substantially the entire door 14 acts a sensing element of the magnetic sensor 10, wherein the effect of changes to the magnetic characteristics thereof on the number and distribution of the magnetic flux lines 62 propagates at the speed of light from the location of the disturbance to the at least one coil 42. Moreover, by placing the at least one coil 42 on at least one hinge 18, and on the striker 22, the door 14 becomes a sensing element without actually running any wires or signal cables into the door 14. The magnetic sensor 10 using the door 14 as a sensing element in a proximity sensing mode can be used to either monitor a blind spot of the vehicle 12 to monitor traffic in an adjacent lane.

With substantially the entire door 14 as a sensor, the magnetic sensor 10 can sense incoming objects approximately of door dimension. Car bumpers and roadside poles similar to the door dimension, for which a safety restraint actuator 60 would be required in a crash, will generally be visible whereas basketball and other small objects, for which a safety restraint actuator 60 would not be required, would be less visible. A shopping cart loaded with groceries would also be visible to the magnetic sensor 10, however the decision of whether or not to deploy a safety restraint actuator 60 would be based upon more factors than just the visibility of a particular object. The magnetic sensor 10 is not responsive to impacts such as impacts to the undercarriage, for example from a rock, that do not affect the magnetic circuit 38, but which might otherwise affect an acceleration based crash sensor.

Accordingly, the magnetic sensor 10 is responsive to various to various physical effects upon the magnetic circuit 38, including but not limited to the following:

1) Changes to the air gap 28 of the magnetic circuit affecting the bent metal flux component 64.
2) Changes in the shape and density of the proximity flux component 66 proximate to the air gap 28 surrounding the door 14, including the front edge of the door 14 and front fender, the rear edge of door 14 and rear fender (or the rear door of a four (4) door vehicle), the bottom of the door 14 to floor board, and, to a lesser extent, the top of the door 14 or window frame to the roof The bent metal flux component 64 is responsive to deformations of the door or adjacent body components that close, or short, the air gap 28.
3) As a relatively large metal object approaches the door, particularly in the gap around the door, the local magnetic field will be disturbed, whereby the coils 42.1, 42.2 and 42.3 acting like metal locators for particular coil sizes and locations will sense this change, responsive to which the microprocessor 52 can make a pre-collision prediction of the velocity of the object
4) The door 14, particularly the skin thereof, has a natural resonant frequency that can be excited by the at least one coil 42 if driven at that frequency the at least one first signal 42. At this resonant frequency, if the vibrating elements of the door 14 become constrained as by contact with an impacting object, this causes a dampening of the resonance which increases the eddy current losses in the magnetic circuit 38, which can be measured by the bypass power processor 66 from the power supplied to the at least one coil 42.
5) The structural elements of the door 14 typically provide a path of least reluctance for the associated magnetic flux 50, and mechanical stresses therein can alter the reluctance thereof, so that changes to the magnetic flux 50 can be related to the level of forces applied to the door 14 and to the structural elements thereof, which force levels can be related to the momentum or velocity of the impacting object. Accordingly, the measurements of the magnetic flux 50 provides a measure of threat to the door 14.

The at least one first signal 42 from the at least one coil 42 is continuously monitored and stored in a memory of a microprocessor 52 as a real-time magnetic signature of the door 14. The real-time magnetic signature is compared with at least one other comparable magnetic signature—for example at least one magnetic signature representing the door 14 prior to an impact or collision, i.e. a normal signature; or at least one magnetic signature representing various impacts or crashes—in order to determine if an associated safety restraint actuator 60 should be actuated. The at least one normal signature may include magnetic signatures that account for variations in the magnetic flux 50 as a result of either metal objects proximate to or approaching the door 14 or variations as a result of corrosion or variations in temperature. The normal signature may be updated over time so as to track minor perturbations of the door 14, such as due to temperature or corrosion. If the real-time magnetic signature is sufficiently different from the normal magnetic signature, the microprocessor 52 would actuate the safety restraint actuator 60.

Accordingly, the magnetic sensor 10 is responsive to both small-signal and large-signal disturbances. Small-signal disturbances would include, for example, impacts by relatively small objects such as basketballs or other sporting projectiles, which typically do not cause plastic deformation of the door 14, but for which the door 14 and surrounding weather-seal respond elastically. Large-signal disturbances would include, for example, side impacts that causes plastic deformation of the door 14, thereby permanently shifting its magnetic signature. The magnetic sensor 10 detects the change in magnetic signature from the pre-impact undeformed condition to the post-impact deformed condition. Moreover, the plastically deformed metal is work hardened which causes a change to the permeance thereof, which is sensed by the magnetic sensor 10. At the beginning of the impact, prior to plastic deformation of the door 14, the magnetic sensor 10 is able to estimate the impact velocity and severity of the impact using principles of the physics of collisions including conservation of energy and momentum, whereby the response of the door 14 increases with increasing impact severity. The measure of self-inductance of the at least one coil 42 comprises information about both the instantaneous position and the instantaneous velocity of the door 14. Moreover, particular polarities of the signal are indicative of particular motions of the door 14.

The magnetic sensor 10 provides a real-time validation of the health and integrity of the respective at least one coil 42 and the second coil, by testing the respective coils for shorts or open conditions, or by using a separate sense coil 58 to detect the magnetic flux 50 generated by the at least one coil 42. Moreover, the magnetic sensor 10 provides a continuous test of the integrity of the magnetic circuit 38, including the component under magnetic surveillance, for example the door 14.

In one embodiment of the magnetic sensor 10, the at least one coil 42 comprises the three coils 42.1, 42.2 and 42.3 located as described by example hereinabove. In another aspect of the magnetic sensor 10, the coils 42.1, 42.2 and 42.3 are further responsive to magnetostrictive effects as a result of collision induced mechanical stresses in the door 14. This arrangement is responsive to a range of wavelengths of the associated stress waves, and can detect shifts in the intrinsic center of magnetic mass and permeance of the door 14 as a result of bending. The locations 48.1, 48.2, 48.3 on the hinges 18 and striker 22 are within the path of maximum stress when the door 14 is impacted, which provides for enhanced sensitivity to magnetostrictive effects.

In another embodiment, the at least one coil 42 comprises a single coil 42, for example a coil 42.3 on the striker 22 or a coil 42.1 or 42.3 on one of the hinges 18.

The at least one coil 42 can be located at a variety of locations and constructed in accordance with a variety of configurations, including but not limited to the following: one or more hinges; the striker; the side impact protection rail or beam inside the door; around or proximate to the latch/lock mechanism either inside or outside the door; inside the spot weld line on the top or bottom of the door; around or proximate to the hinge bolts; on the inner door skin of a plastic or steel door with the perimeter of the coil nearly matching the perimeter of the door; around the window glass perimeter; around the entire door structure such as in the air gap surrounding the door and the opening that one passes through when entering or exiting the vehicle; in a window such as the driver-side window, as a defroster; behind a plastic door handle or trim component, along with associated electronics; around the window glass opening in the door through which the window is lowered; in the plastic side view mirror housing for sensing over an extended range, for example to locate steel objects that might pose a side-impact threat.

The magnetic fields generated by these arrangements have a variety of principal orientations, including but not limited to longitudinal, transverse, and vertical. For example, a coil 42 can be placed around a hinge 18 so that the associated magnetic field is either longitudinal or transverse, the former arrangement providing principally a bent metal flux component 64, whereas the later arrangement providing a relatively strong proximity flux component 66. As another example, a coil 42 around the window glass opening in the door 14 through which the window is lowered generates a vertical magnetic field that circulates around the vehicle along a transverse section thereof. As yet another example, a coil 42 around the door 14 or window in the plane thereof generates a transverse magnetic field that is useful for proximity sensing. Different coils 42, at least one adapted to produce principally a bent metal flux component 64 and the other adapted to produce principally a proximity flux component 66 can be used with different associated first signals 44, for example, respective first signals with different oscillation frequencies, so as to provide distinguishable measures of deformation of the door 14 and proximity of proximate objects.

The operating point of the magnetic sensor 10, for example the level of magnetic flux 50 within the magnetic circuit 38 and the nominal current supplied to the at least one coil 42, under quiescent conditions, can be adjusted by adjusting the wire gage or number of turns of at least one coil 42.

The system safing or proximity detection can be enhanced by various means, including but not limited to placing a winding around the undercarriage, door opening, or hood of the automobile; placing a winding around the front fender of the automobile; placing a ferrite rod inside the hinge coil, or inside the striker coil for magnetic focusing; placing a ferrite rod coil in the gap or space between the doors; or placing a supplemental coil 42 in the side-view mirror molding, which extends sidewards away from the vehicle. An additional system safing supplemental coil 42, with proper phasing and with the magnetic circuit return properly adjusted, would substantially increase the system safing signal performance. For example, this coil could be about 3 inches in diameter and in a plane parallel to the door surface, or wound on a ferrite rod aligned to enhance the launch range and enhance the directivity for system safing. Moreover, by the combination of proximity detection and bent metal detection, together with a self-test of the associated at least one coil 42, the magnetic sensor 10 is able to provide both safing and crash detection functions, thereby precluding the need for a separate crash accelerometer. The coils 42, 54 and 62 of the magnetic sensor 10 could, for example, be constructed of wire wound on an associated bobbin, and then placed over an existing component of the vehicle, for example a hinge 18 or striker 22.

The coils or sensing elements may incorporate a ferrite or other high permeability magnetic core. Also, highly-tuned coils can be used for magnetic signal generation. Moreover, the width and length of coil bobbins can be adapted to steer the magnetic flux 50. Lastly, the at least one coil 42 might incorporate ferrite rod coils placed under the vehicle chassis, in the vehicle headliner, in the "A" pillar, or in the "B" pillar, pointing towards the road.

If both front doors are to be protected, then the effects of temperature and component variation may be mitigated by making a ratiometric measurement of comparable signals from one door relative to another, wherein it is assumed that both doors will not be simultaneously impacted. The ratiometric measurement may also be used to augment the individual measurements from each door.

Whereas the magnetic sensor 10 has been illustrated herein with the door 14 as a principal sensing element, the magnetic sensor 10 may generally be adapted to sensing the integrity of any component of any component capable of conducting magnetic flux 50, and would be advantageous for sensing large or long ferromagnetic parts. For example, the magnetic sensor 10 can be adapted to sensing other body parts, such as fenders, that attach to the main body of the vehicle by operatively connecting an at least one coil 42 between the body part and the main body at the point of attachment.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A method of sensing a vehicle crash, comprising:
   a. generating a magnetic flux in a body portion of a vehicle from an intrinsic magnetomotive force in said body portion, wherein said body portion is subject to impact during the vehicle crash;
   b. conducting said magnetic flux in a closed magnetic circuit within said vehicle, wherein said magnetic circuit comprises said body portion;
   c. generating a signal responsive to said magnetic flux; and
   d. discriminating the vehicle crash responsive to said signal.

2. A method of sensing a vehicle crash as recited in claim 1, wherein said operation of generating a signal responsive to said magnetic flux comprises sensing said magnetic flux with at least one magnetic sensing element.

3. A method of sensing a vehicle crash as recited in claim 2, wherein said at least one magnetic sensing element comprises a plurality of magnetic sensing elements.

4. A method of sensing a vehicle crash as recited in claim 2, wherein said at least one magnetic sensing element is selected from a coil and a Hall-effect sensor.

5. A method of sensing a vehicle crash as recited in claim 2, wherein at least one said at least one magnetic sensing element is proximate to a vehicle body element selected from a door hinge or a mounting bolt thereof, a door lock or latch mechanism or a mounting bolt thereof, a striker of a door lock or latch mechanism or a mounting bolt thereof, a door reinforcing element, and an end wall of a door.

6. A method of sensing a vehicle crash as recited in claim 5, wherein at least one said at least one magnetic sensing element is around at least one said vehicle body element.

7. A method of sensing a vehicle crash as recited in claim 2, wherein at least one said at least one magnetic sensing element is proximate to a vehicle body element selected from a door, a door opening, a portion of a side view mirror housing and a window opening.

8. A method of sensing a vehicle crash as recited in claim 7, wherein at least one said at least one magnetic sensing element is around at least one said vehicle body element.

9. A method of sensing a vehicle crash as recited in claim 3, wherein said plurality of magnetic sensing elements are located at distinct locations of said vehicle body.

10. A method of sensing a vehicle crash as recited in claim 3, wherein said plurality of magnetic sensing elements are associated with a same door.

11. A method of sensing a vehicle crash as recited in claim 2, wherein said operation of generating a signal responsive comprises at least partially resonating said magnetic sensing element.

12. A method of sensing a vehicle crash as recited in claim 1, further comprising controlling an actuation of a safety restraint system responsive to said operation of discriminating said vehicle crash.

* * * * *